US008259118B2

(12) United States Patent
Roseborough et al.

(10) Patent No.: US 8,259,118 B2
(45) Date of Patent: Sep. 4, 2012

(54) EVENT BASED INTERACTIVE ANIMATION

(75) Inventors: James Roseborough, Piedmont, CA (US); Ian Farmer, Oakland, CA (US)

(73) Assignee: MobiTV, Inc., Emeryville, CA (US)

( * ) Notice: Subject to any disclaimer, the term of this patent is extended or adjusted under 35 U.S.C. 154(b) by 771 days.

(21) Appl. No.: 12/334,384

(22) Filed: Dec. 12, 2008

(65) Prior Publication Data

US 2010/0149188 A1 Jun. 17, 2010

(51) Int. Cl.
*G06T 11/20* (2006.01)

(52) U.S. Cl. ........ 345/475; 345/441; 345/442; 345/443; 345/473; 345/474; 382/300

(58) Field of Classification Search .......... 345/441–443, 345/473–475; 382/300
See application file for complete search history.

(56) References Cited

U.S. PATENT DOCUMENTS

| | | | |
|---|---|---|---|
| 6,141,019 A | 10/2000 | Roseborough et al. | |
| 7,218,326 B1* | 5/2007 | Bogues et al. | 345/442 |
| 7,469,064 B2* | 12/2008 | Furuya et al. | 382/195 |
| 7,483,030 B2* | 1/2009 | Kass et al. | 345/473 |
| 7,773,796 B2* | 8/2010 | Bledsoe et al. | 382/141 |
| 7,864,980 B2* | 1/2011 | Evans | 382/103 |
| 2004/0175684 A1* | 9/2004 | Kaasa et al. | 434/262 |
| 2006/0281508 A1* | 12/2006 | Carney et al. | 463/6 |
| 2008/0062177 A1* | 3/2008 | Gaul et al. | 345/440 |

OTHER PUBLICATIONS

Guibas, L.; A kinetic framework for computational geometry; 1983; 24*th* Annual Symposium on Foundations of Computer Science.*

* cited by examiner

*Primary Examiner* — Xiao M. Wu
*Assistant Examiner* — Todd Buttram
(74) *Attorney, Agent, or Firm* — Kwan & Olynick LLP

(57) ABSTRACT

A client device receives a user interface event corresponding to a spline curve associated with an object displayed on a mobile device. The user interface triggers creation of a new spline curve based on computation of a new spline tangent associated with the spline curve and phase space-based dynamics of a new state. A scene graph having state information associated with the new state is maintained. A rendering event triggers repainting of the object associated with the spline curve using the scene graph.

20 Claims, 9 Drawing Sheets

| Linear movement 501 | {500,100} | Move with constant velocity to value=100 in 500 msec | Exactly linear motion |
|---|---|---|---|
| Deceleration 503 | {500,100,100} | Move to value=100 in 500 msec, decel at end | Simple deceleration effect |
| Quadratic deceleration 505 | {500,100,100,100} | Move to value=100 in 500 msec, decel with quadratic curve | Pronounced deceleration effect |
| Overshoot 507 | {2000,150,100,100} | Move to value=100 in 2000 msec, overshoot first then fall back | Overshoot effect |
| Bounce 509 | {{700, 200,100},{0,100},{500,150,100}} | Bounce once on way to goal of 100 in 1200 msed total | Single-bounce effect |
| Linear looping 511 | {500,100,loop=true} | Loop forever with constant velocity to value=100 every 500 msec | Marquees |
| Velocity blending 513 | {500,100,100,100,cvel=true} | Velocity blending, then quadratic decay | Typical blend and decay effect |

Figure 5

EVENT BASED INTERACTIVE ANIMATION

TECHNICAL FIELD

The present disclosure relates to event based interactive animation on client devices.

DESCRIPTION OF RELATED ART

Various user interface toolkits have been used to develop applications that allow a user to interact with animated graphical entities. Animated graphical entities may be modeled using physics based simulation including dynamic equations of motion. A wide array of functions can be used in applications to interpolate and smooth animated graphical data.

However, conventional graphical animation mechanisms have significant limitations and drawbacks. Consequently, it is desirable to provide improved techniques and mechanisms for allowing event based interactive animation.

BRIEF DESCRIPTION OF THE DRAWINGS

The disclosure may best be understood by reference to the following description taken in conjunction with the accompanying drawings, which illustrate particular embodiments.

FIG. 5 illustrate example representations of splines.

DESCRIPTION OF EXAMPLE EMBODIMENTS

Figure 1A:
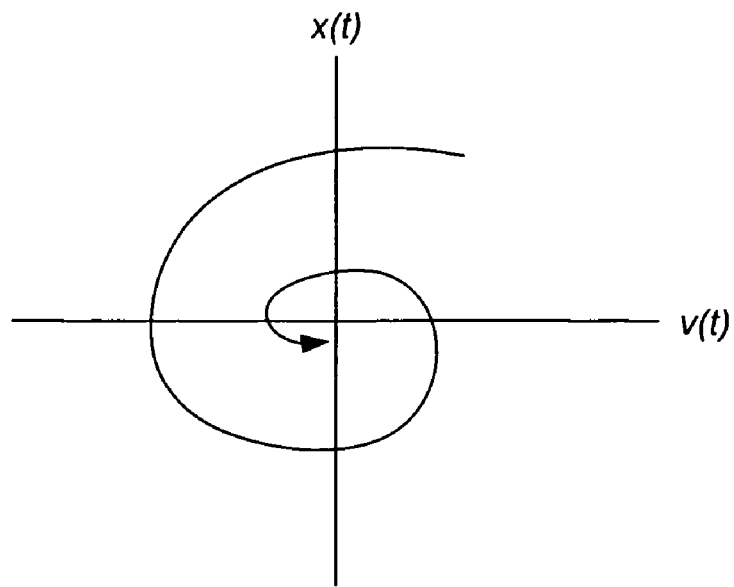
FIGS. 1A-1B illustrate under-damped and over-damped linear systems.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of mobile devices having limited processing resources. However, it should be noted that the techniques of the present invention apply to a variety of devices. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

A client device receives a user interface event corresponding to a spline curve associated with an object displayed on a mobile device. The user interface triggers creation of a new spline curve based on computation of a new spline tangent associated with the spline curve and phase space-based dynamics of a new state. A scene graph having state information associated with the new state is maintained. A rendering event triggers repainting of the object associated with the spline curve using the scene graph.

Example Embodiments

In a variety of applications, it is desirable to allow interaction with animated objects on a screen. For example, application developers may want animated objects that evolve according to arbitrary dynamic equations. The application developers may also want to allow a user to interact with animated objects in arbitrary ways. Updates of the animated object should be provided efficiently to a screen. Although numerous animation mechanisms are known, many are inefficient and unsuitable for devices having limited processing power.

Animation systems having a variety of techniques for modeling dynamic systems and manipulating them. One mechanism for modeling a dynamic system uses differential equations. For example, a simple spring-mass-damper system may be modeled as follows:

$$\dot{x}=v$$

$$\dot{v}=-kx-bv \quad \text{(Equation 1)}$$

Virtually any dynamic system can be modeled with evolution equations such as these including high order, non linear, and time-varying systems.

To simulate evolution equations, a discrete form can also be use. One example is the following Euler-integration:

$$x_{t+\Delta t}=x_t \Delta t v_t$$

$$v_{t+\Delta t}=v_t-kx_t-bv_t \quad \text{(Equation 2)}$$

For more accuracy, Runga-Kutta or similar techniques may be used in place of Euler integration. These still involve the computation of the state at time t+Δt from the state at time t and a set of first-order differential equations.

For sufficiently simple linear systems, a closed form solution may exist. For example, a 2nd order linear system solution may be represented as follows:

$$x(t) = e^{-t/\tau}(A\cos(\omega_d t) + B\sin(\omega_d t))$$ (Equation 3)

where $\tau$ and $\omega_d$ are determined from system coefficients, and A and B are determined from initial conditions.

A closed form solution such as that shown in Equation 3 can be plotted in "phase-space" which is a plot of position vs. velocity. Solutions will appear as curves in this space. When the system is not being affected by outside forces, it may have one set of dynamics that correspond to an under-damped linear system. FIG. 1A illustrates one example of an under-damped linear system.

Figure 1B:
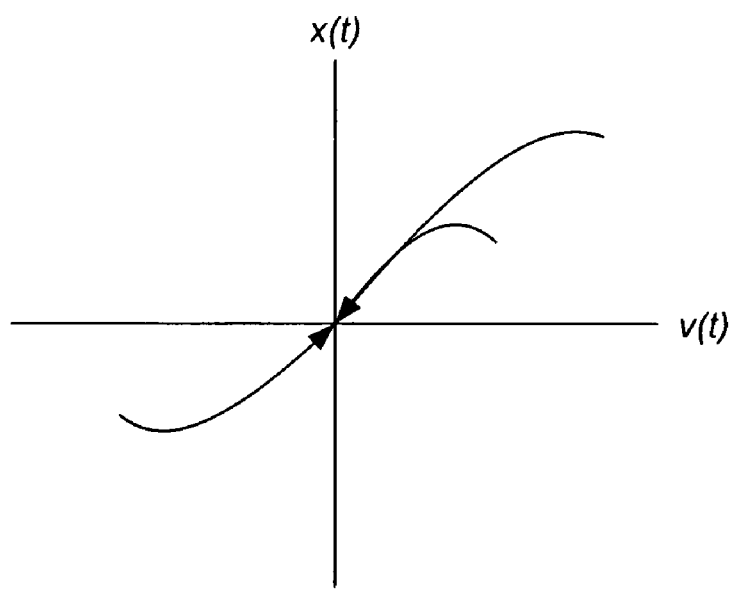

When the system is under influence of some outside force, e.g. it is being grabbed by something with significant friction, then its dynamics may change to reflect the effects of the forcing function. The set of dynamics may now correspond to that of an over-damped system. FIG. 1B illustrates one example of an over-damped system.

Multiple paths are shown to indicate that the actual path traversed will depend on the initial conditions. This diagram shows the path terminating on x=v=0, but could terminate on x≠0 if the "target" position is not 0.

Spline curves can be used to approximate curves in many contexts. Any convenient spline formulation may be used including 3rd order segments. A Bézier spline curve is a parametric curve used to model smooth curves that can be scaled indefinitely. Images can be created by combining multiple Bézier curves. Paths are not bound by the limits of rasterized images and are intuitive to modify. Bézier curves are often used in animation as a tool to control motion. The spline curves approximate the phase space variables as a function of time. The phase space value at any point in time is computed by interpolating the active spline at that time. The position is one element of the complete phase space vector. The formulation should be chosen so that computing the velocity is also straightforward and known. In a typical case, velocity will be used to blend splines in phase space when UI events occur. If smoothing in higher order derivatives is required, the phase space is formulated to contain these derivatives, splines are computed for each derivative, and the continuity constraint is maintained up the number of derivatives desired.

Figure 2A:
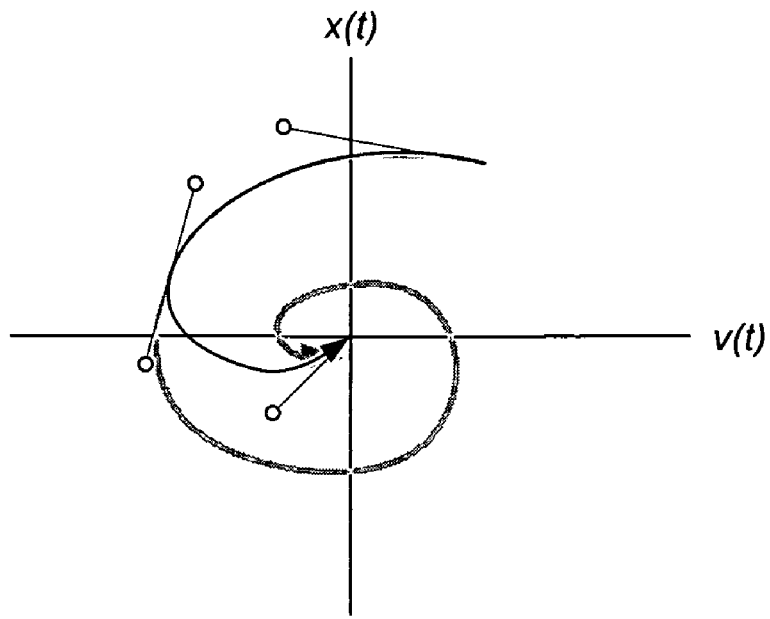
FIGS. 2A-2B illustrate forced and unforced states.
Figure 2B:
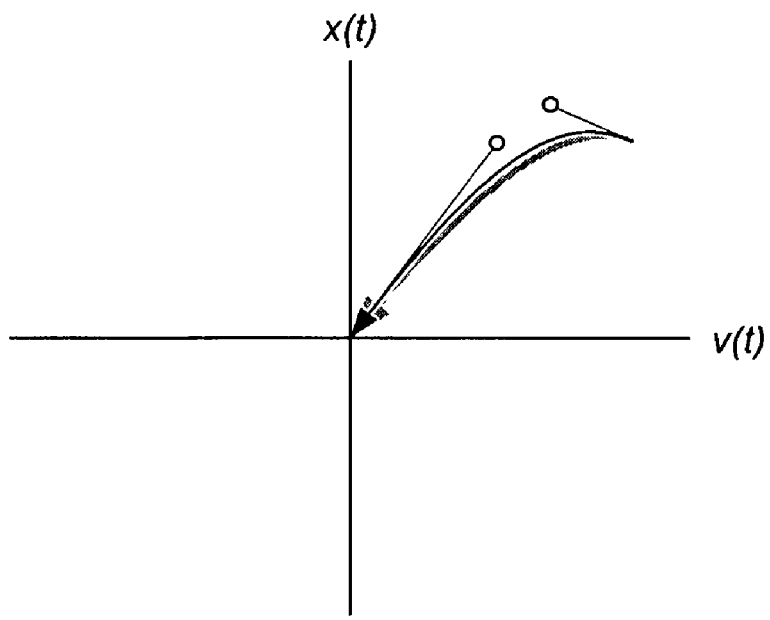

Spline curves can be used to provide a low-order representation of the phase-space solution to the animation system in the two different states, the "forced" state shown in FIG. 2A and the "unforced" state shown in FIG. 2B.

The spline can contain additional terms to provide any degree of precision the approximation of these dynamics requires. The example also illustrates that the approximation can provide behavior that does not in practice, such as coming to a complete stop in a finite time rather than asymptotically approaching a stop.

In a typical computer graphical user interface (GUI), pointer movements are translated into discrete events at which changes in pointer position are communicated. A particular challenge is that these events come in at unpredictable times and with uneven spacing. Consequently, the techniques and mechanisms of the present invention contemplate having both user interface (UI) events and periodic events as triggers. In particular embodiments, spline curves are interpolated during these triggers.

According to various embodiments, an animation system is modeled as having several components. A UI event thread pushes unevenly spaced discrete updates about pointer movements associated with states including grab, drag, and drop. An animation thread pushes requests for changes to the animation time that are independent of the UI events. These requests may be triggered by clock ticks. A rendering layer takes time to draw graphics at any particular animation time. In particular embodiments, the rendering layer performs repainting. The animation system also includes a scene graph that holds animation and rendering state at any particular time.

Figure 3:
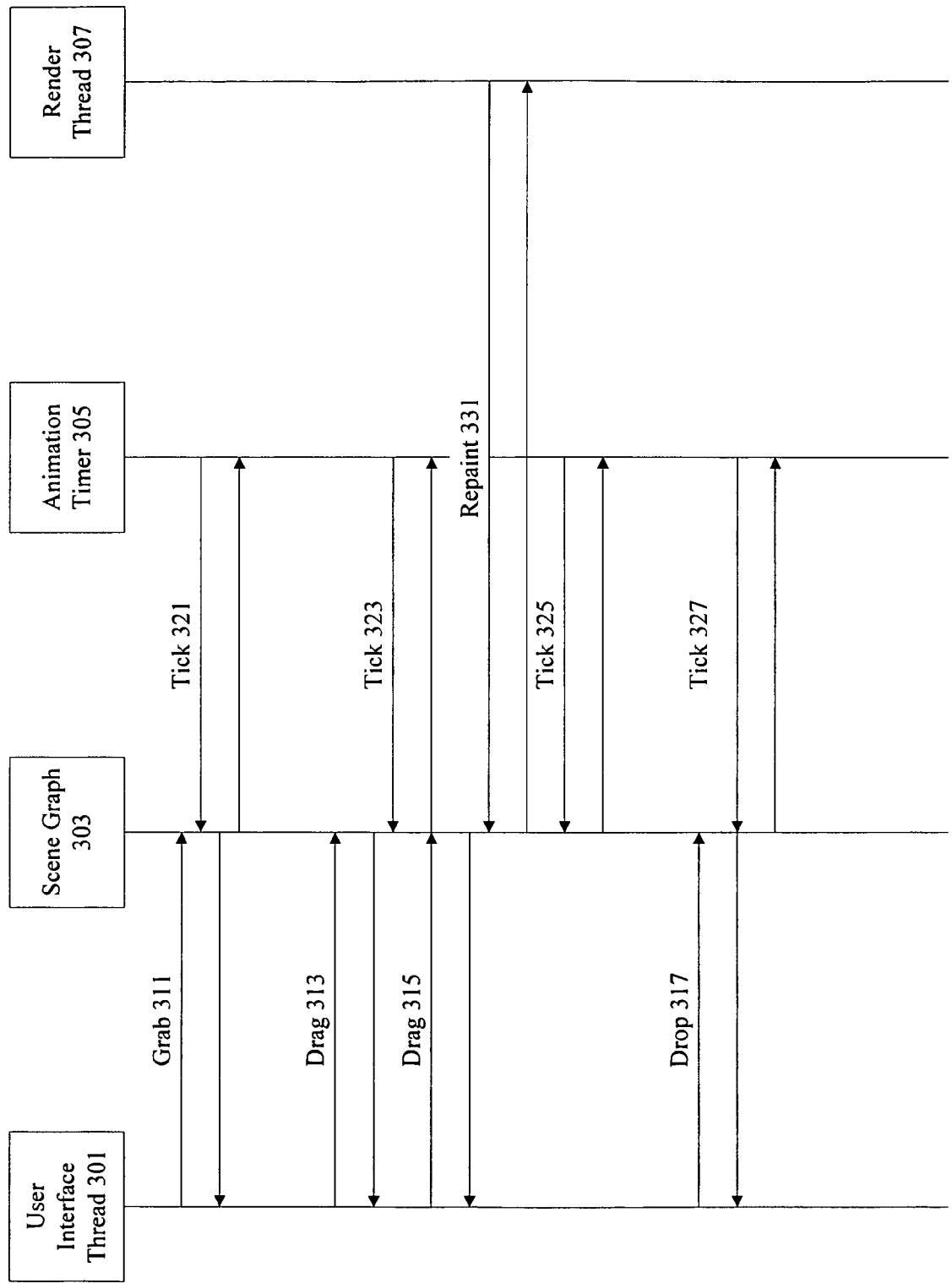
FIG. 3 illustrates one example of an animation system.

FIG. 3 illustrates one example of an animation system. A user interface thread 301 monitors user input including keystrokes, pointer movements, mouse clicks, touchpad activity, etc. The user interface thread 301 sends signals to scene graph 303. In particular embodiments, the user interface thread 301 sends grab signal 311, drag signal 313, drag signal 315, and drop signal 317 as they occur. Scene graph 303 maintains state information associated with objects manipulated by a user. An animation timer 305 sends periodic ticks 321, 323, 325, and 327 to a scene graph 303. In particular embodiments, the periodic ticks may be triggered by an internal clock and may vary somewhat due to load. A render thread 307 sends a repaint signal 331 to repaint portions of the screen according to independent rules for refreshing a display.

According to various embodiments, various computations are performed at each point. For grab signal 311, the physics associated with an object are changed to those of a grab state or forced solution state and the spline curve is recomputed. For drop signal 317, the physics associated with the object are changed to those of a drop state or unforced solution state and the spline curve is recomputed. For drag signals 313 and 315, the spline target is changed to a new position and the spline curve is recomputed. At each tick 321, 323, 325, and 327, the spline curve is interpolated according to the animation time and the state maintained by the scene graph 303. For repaint signal 331, repainting is done or a scene graph is copied so that repainting can be performed.

Figure 4:
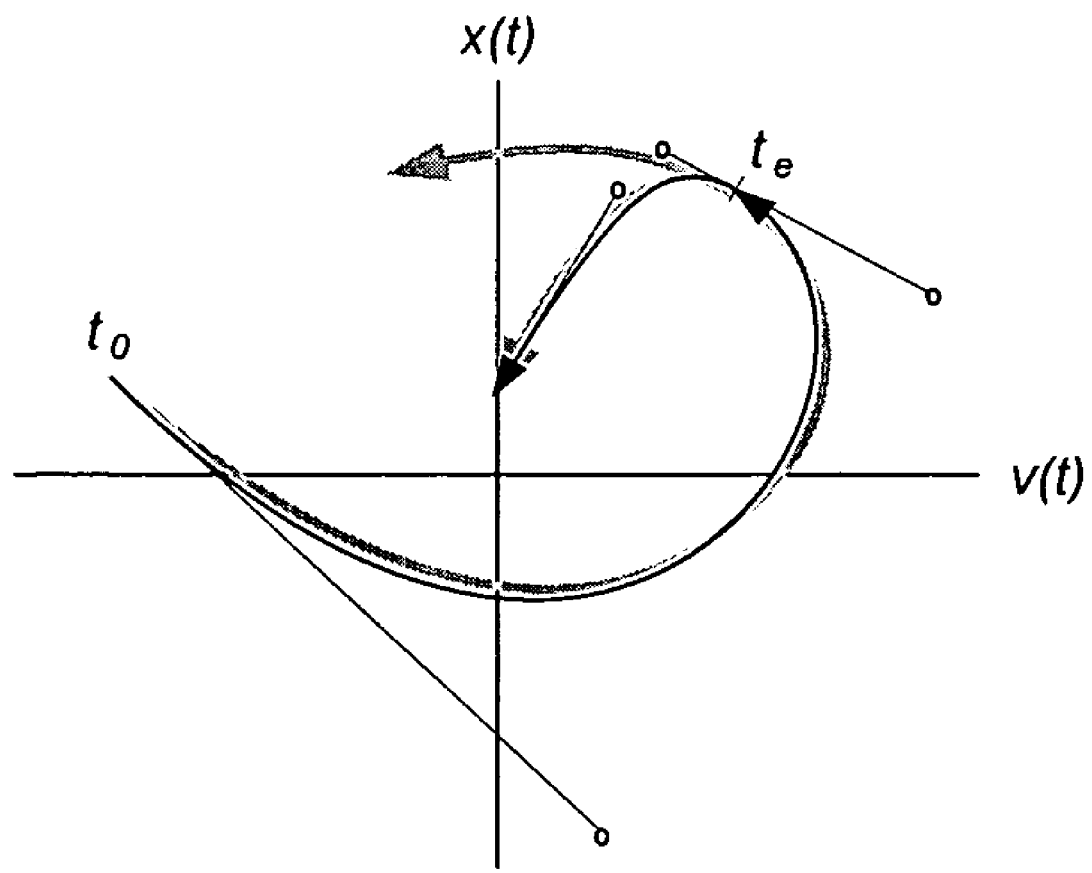
FIG. 4 illustrates one example of recomputing spline dynamics based on user interface events.

FIG. 4 illustrates one example of recomputing spline dynamics based on UI events. According to various embodiments, a UI event such as a pointer event that grabs an object triggers a change in dynamics. In particular embodiments, the new spline tangents are computed, and a new spline is created based on the tangents and the phase space-based dynamics of the new condition. In FIG. 4, the unforced dynamics are in effect from t0 to te. After te, a smooth transition is made to a new spline representing the forced dynamics with a non-zero final target position. When animation ticks are processed, the active spline is interpolated to get the current point in phase space. The point used in graphics rendering is the position coordinate of the phase space vector.

According to various embodiments, this can be repeated for each event to result in a smooth trajectory through phase space. Desired but arbitrary physics can be applied at every point in the trajectory. Intermediate animation points are efficiently computed and good numerical stability for all aspects of the computation.

FIG. 5 illustrates one example of a mechanism for representing spline dynamics. According to various embodiments, spline values are of the following form:
{[loop=true,] [cvel=true,] {dt1, [[x1b,] x1a,] x1} [,{dt2, [[x2b,] x2a,] x2} [ . . . ]]}
which breaks down into
{[namedoptions] segment [, segment [ . . . ]]}
where segment i consists of a time delta dti and a list of 1, 2, or 3 bezier control points xi, xia, and xib depending on the degree of interpolation:
{dti, [[xib,] xia,] xi}
For the common case of a single-segment spline, a short-form is allowed:
{dt1, [namedoptions] [[x1b,] x1a,] x1}

The valid named options are:
loop=count where count is one of {1, 2, . . . } or true to loop forever
cvel=true for constant-velocity blending with previous state According to various embodiments, linear movement 501 is represented as {500,100}. In particular embodiments, an object is moved with constant velocity to value=100 in 500 msec in exactly linear motion. According to various embodiments, deceleration 503 is represented as {500,100,100}. In particular embodiments, an object is moved to value=100 in 500 msec with deceleration at the end. According to various embodiments, quadratic deceleration 505 is represented as {500,100,100,100}. In particular embodiments, an object is moved to value=100 in 500 msec, with deceleration with a quadratic curve at the end. This provides a pronounced deceleration effect According to various embodiments, overshoot 507 is represented as {2000,150,100,100}. In particular embodiments, an object is moved to value=100 in 2000 msec with overshoot and subsequently fall back. According to various embodiments, bounce 509 is represented as {{700,200,100},{0,100},{500,150,100}}. In particular embodiments, an object bounces once on a way to goal of 100 in 1200 msec total. According to various embodiments, linear looping 511 is represented as {500,100,loop=true}. A loop occurs forever with constant velocity to value=100 every 500 msec. According to various embodiments, velocity blending 513 is represented as {500,100,100,100,cvel=true}. In particular embodiments, an object is velocity blended with quadric decay.

Figure 6:
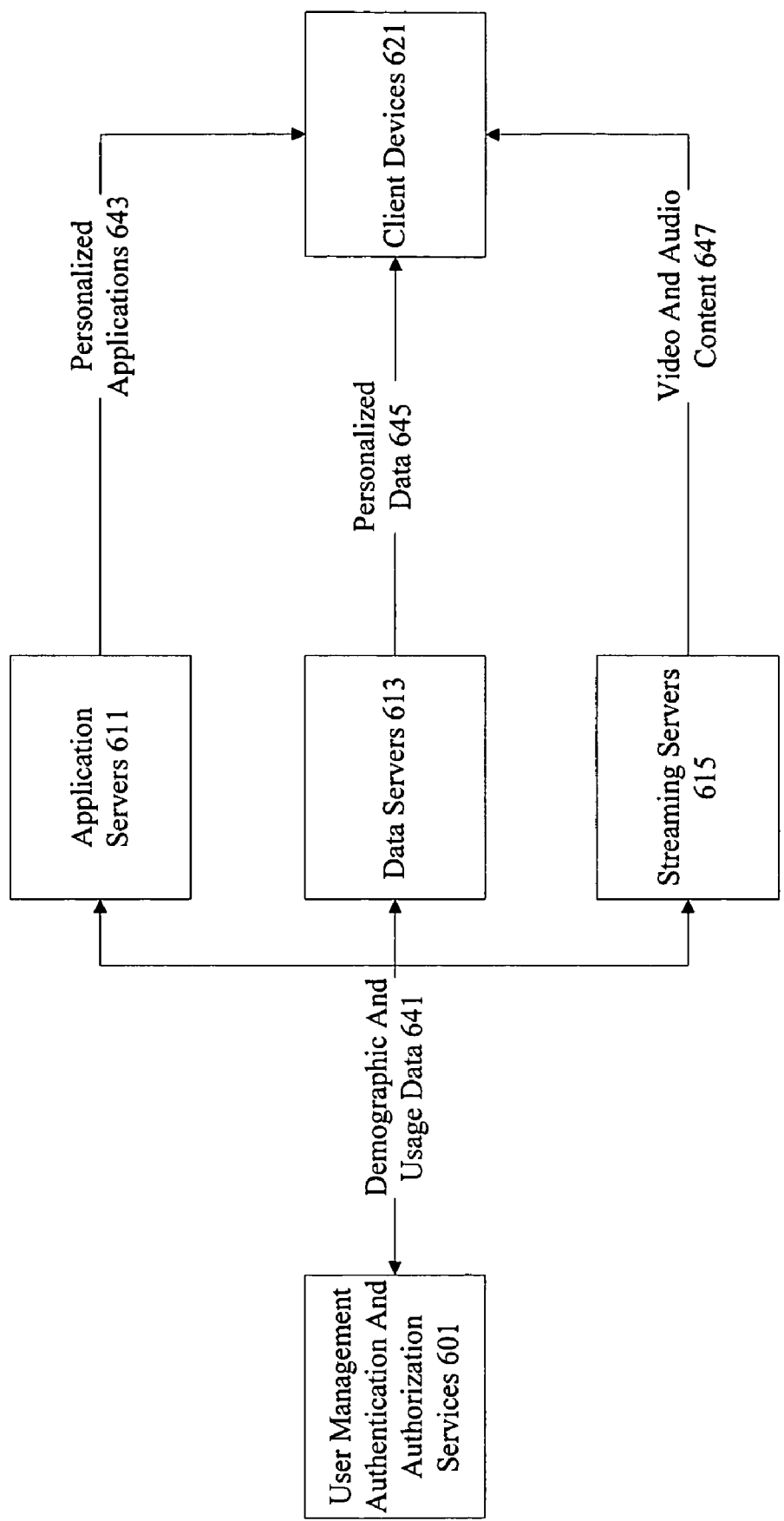
FIG. 6 illustrates one example of a client side interpreter platform.

The techniques and mechanisms of the present invention can be implemented in a variety of systems. FIG. 6 illustrates one example of a system that includes mobile devices. According to various embodiments, a client side interpreter platform includes client components and server components. Server components include applications servers 611, data servers 613, and streaming server 615. In particular embodiments, the server operate to deploy, maintain, and update client side interpreter applications. In some examples, user management, authentication, and authorization services are provided along with the ability to integrate with service provider facilities. Application servers 611 provide personalized application 643 to client devices 621 such as mobile devices. According to various embodiments, the application servers 611 provide application updates. Carriers can easily upgrade, modify, or personalize client applications for delivery to end users or groups of end users based on usage patterns, geographical location, user preferences, subscription type, and device capabilities.

Data servers 613 provide personalized data 645 to client devices 621. In particular embodiments, the data servers 613 manage channel guides and personalized data for individual users. Demographic and usage data 641 is shared with user management authentication and authorization services 601 to provide a personalized user experience based on a user's subscriptions, geographical location, preferences, and device capabilities. Streaming servers 615 provide video and audio content 647 to client devices 621. According to various embodiments, the streaming servers 615 deliver audio and video content to clients. Content can include live television, video on demand (VoD), user generated, and audio.

According to various embodiments, the client side interpreter platform allows rapid development and deployment of applications across a broad range of devices for a variety of users, media applications and customize applications for different users. Applications can be ported to emerging handset and desktop environments efficiently while providing a personalized user experience. Seamless over the air (OTA) upgrades are supported for a number of flexible applications. In particular embodiments, the client side interpreter platform simplifies and streamlines the development process and offers flexibility for updating, modifying, and personalizing applications. It supports separate development of client players and applications, allowing carriers to update and redeploy applications as often as necessary.

In particular embodiments, mobile applications generally fall into two categories: applications that provide access to mobile browser (WAP) pages and custom applications built for each device. The browser pages work on all devices and can be updated at any time, but they provide a poor user experience. Custom applications provide a better user experience but are costly, slow to develop, difficult to deploy, and hard to upgrade.

The client side interpreter platform provides a lightweight standard scripting engine that can be quickly ported to any mobile device. Only the engine is ported, not the entire application. Developing this way is faster and more reliable, because the engine is significantly less complex than the entire application, and once it is ported, it can be reused for many different applications and version upgrades.

The client side interpreter application can be updated on the server at any time. The client side interpreter engine queries the server for the latest rules regarding mandatory and optional upgrades and available versions of the application. To end users, however, the application appears to be custom made for their individual devices, with all available enhanced graphics and user interfaces Developers can add, change, or remove features at any time. For example, a one time promotional feature could appear only during the promotion time frame without being tied to the handset release. Customization based on user, device, location, time, or any number of options is possible. The client side interpreter platform provides a new level of dynamic custom application creation and distribution.

In the competitive mobile marketplace, service providers face increasing pressure to rapidly develop, test and deploy client applications. By decoupling player and application development, the client side interpreter allows rapid development of lightweight, scripted applications on short development cycles. The player and application development can proceed in parallel, greatly reducing time to market. The client side interpreter also provides tremendous flexibility in how applications are made available to subscribers. For example, applications may be made available through preloads, vended applications, and OTA upgrades.

Figure 7:
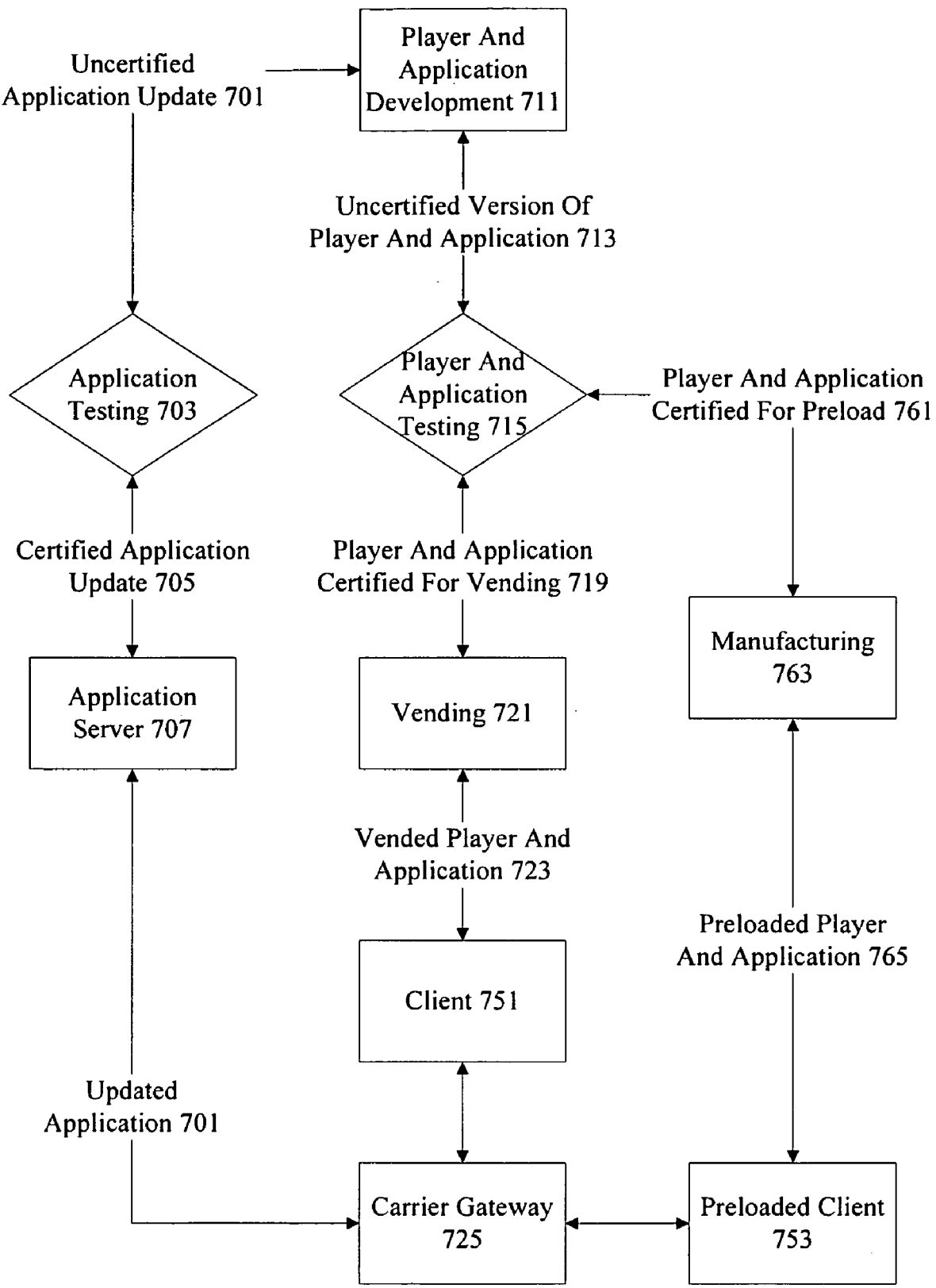
FIG. 7 illustrates examples of client side interpreter application development, testing, and vending mechanisms.

FIG. 7 illustrates mechanisms for development, testing, and vending processes. According to various embodiments, a client side interpreter application can be provided on a client device in a variety of manners. According to various embodiments, device manufacturers can preload the client side interpreter player and application during the manufacturing process. Player and application development 711 provides an uncertified version of the player and application 713 to player and application testing 715. One a player and application is certified for preload at 761, they are provided to manufacturing 763. Manufacturing provided a preloaded player and application 765 onto a preloaded client 753 such as a preloaded mobile device.

OTA upgrades are also supported. According to various embodiments, once the client side interpreter player is on the client device, carriers can update the application OTA as often as necessary and in as targeted a manner as necessary. For example, they can provide different applications to different user groups. In particular embodiments, an uncertified application update 701 may be provided for application testing 703. The certificated application update 705 is provided to an application server 707. The updated application 701 is provided to a carrier gateway 725 that can send the updated application 701 to client devices 751 and 753 OTA.

If the client side interpreter player is not preloaded on a device or provided OTA, carriers may make the client side interpreter player and applications available through their vending services. They also may support applications vended through third parties. According to various embodiments, a player and application certified for vending 719 is provided to vending component 721. The vended player and application 723 is provided to a client 751. As often as necessary, carriers can provide end users with updated versions of the client application OTA through an application delivery server. Application updates require no changes to the client player.

Figure 8:
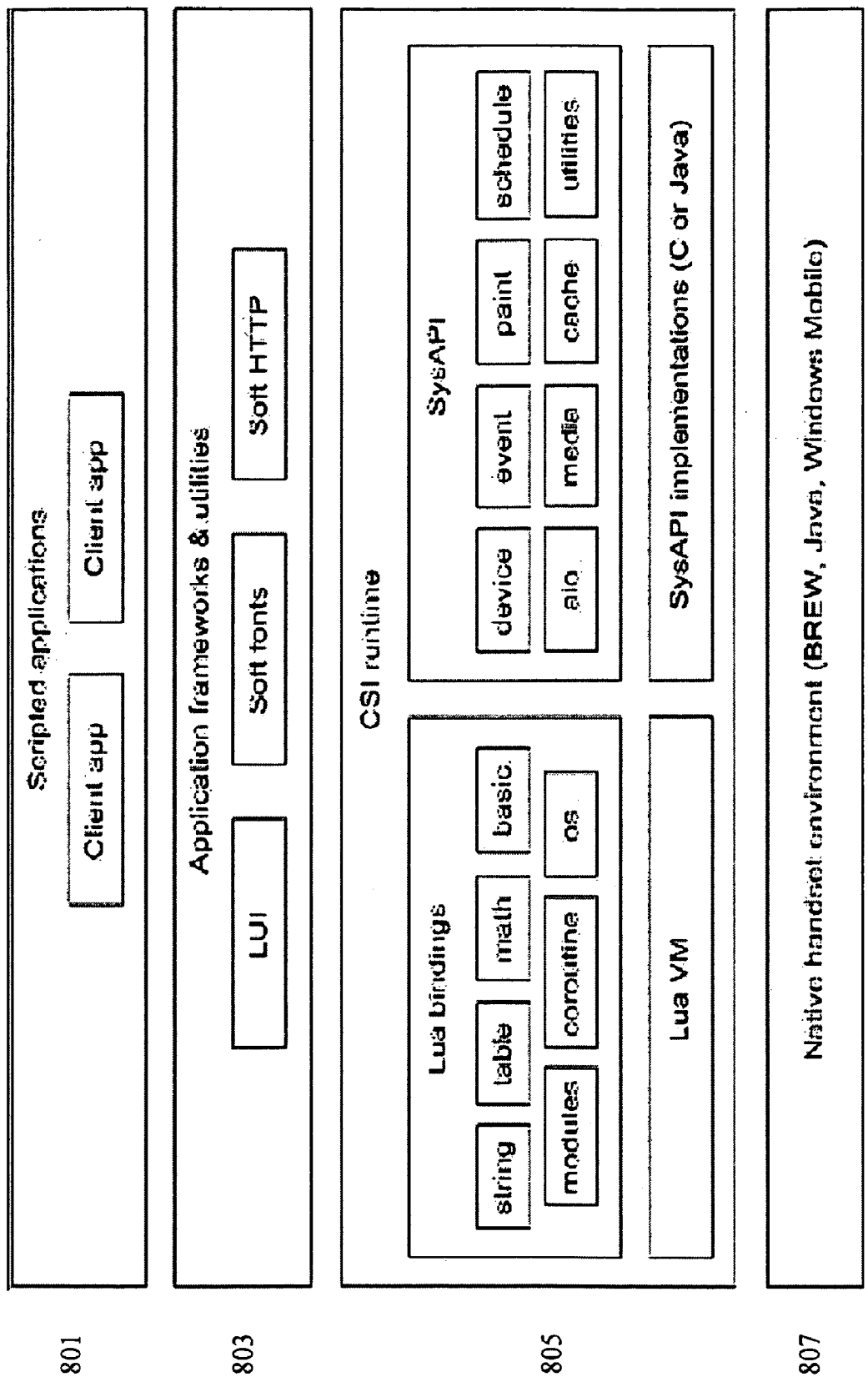
FIG. 8 illustrates one example of a client side interpreter architecture.

FIG. 8 shows an overview of the client side interpreter client architecture. According to various embodiments, client side interpreter applications are built on several layers including a scripted applications layer 801, an application frameworks and utilities layer 803, a runtime layer 805, and a native handset environment layer 807. According to various embodiments, the client side interpreter supports the native handset environments Sun Java™, QUALCOMM® BREW™, and Microsoft® Windows Mobile®, which are recognized as not sufficiently supporting cross-platform portability and re-use. Consequently, the client side interpreter platform incorporates support for each of the above noted handset environments. According to various embodiments, the client side interpreter platform runs on any existing mobile device platform.

According to various embodiments, applications layer 801 includes scripted client applications. Scripted applications can access either the application frameworks or the client side interpreter runtime. Applications are written in Lua, a lightweight and expressive language. Layer 803 includes frameworks and utilities such as soft fonts, soft HTTP, LUI, etc. The soft fonts and soft HTTP utilities allow applications to use fonts or HTTP that work the same way on any handset. These provide an alternative to native fonts or HTTP. Application frameworks and utilities 803 allow a high degree of control over the user interface. The client side interpreter layer 805 includes a virtual machine, implementations, bindings, and utilities that make up the client side interpreter player. According to various embodiments, a Lua virtual machine is a client interpreter for the Lua programming language. In particular embodiments, the Lua virtual machine runs on top of other virtual machines. It runs on Java, BREW, and Windows Mobile and provides full Lua language support. The SysAPI implementations include bindings in the SysAPI. The SysAPI implementations are tuned to perform optimally on each individual device that the service supports.

In particular embodiments, the SysAPI is a common interface to generic mobile device capabilities, including screen paint operations, media playback, and network 10. Developers can write code in Lua to interact with the SysAPI. The Lua bindings provide basic Lua functions, including string, table, math, basic, modules, coroutine, and os. According to various embodiments, the Lua user interface (LUI) is a declarative UI framework that provides navigation, screen flow, and basic UI widgets. It provides a high degree of correspondence between UI specifications and code that implements them.

An over the air update function is included in the client side interpreter player and requests the client application code from the application server. Client side interpreter applications implement specific application behaviors, including authenticating the user, requesting programming guide data and related graphics, screen painting operations, responding to user input, and requesting media streams from a streaming server.

Figure 9:
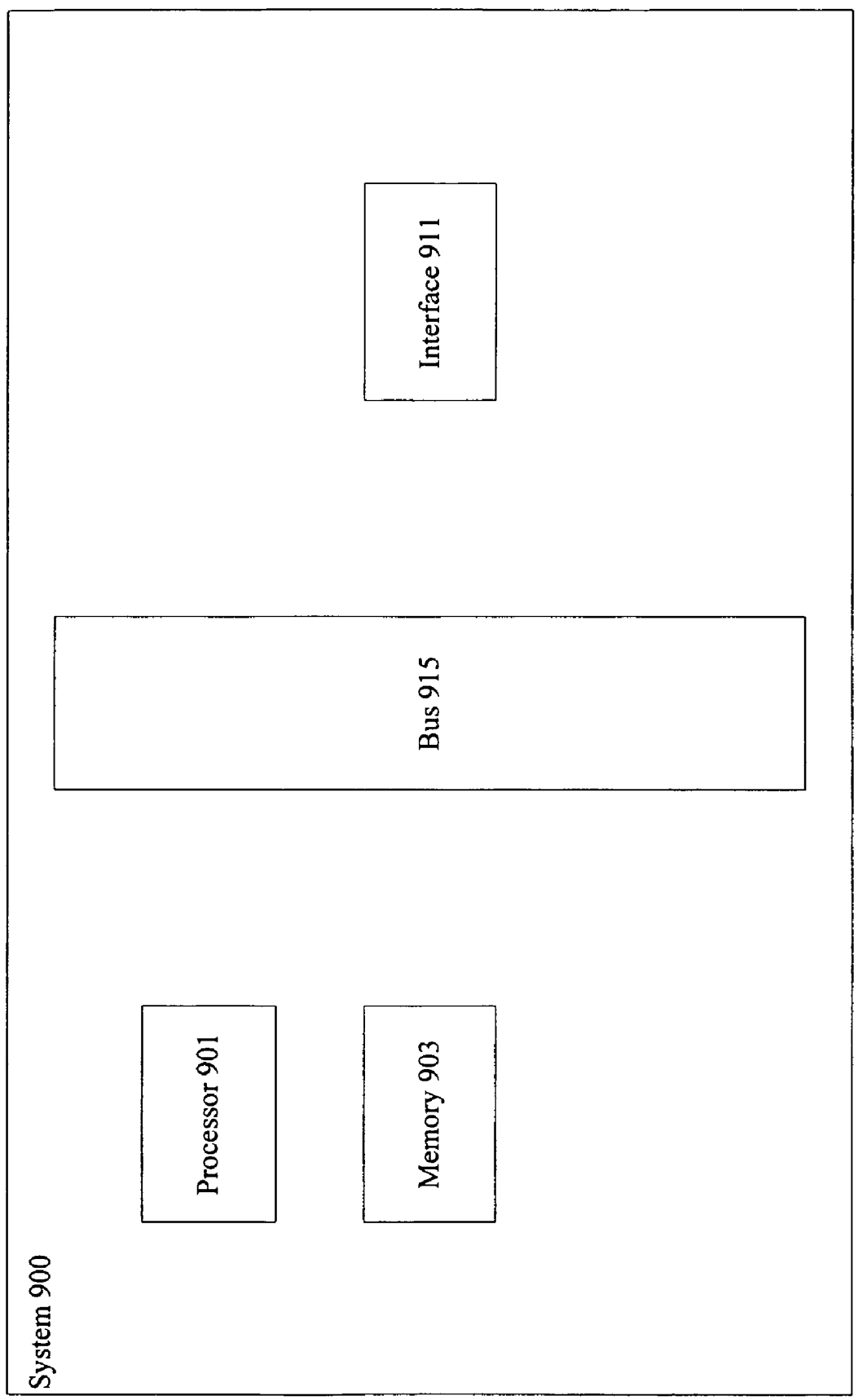
FIG. 9 illustrates one example of a server.

FIG. 9 illustrates one example of a server that can be used as an applications server, data server, or streaming server. According to particular embodiments, a system 900 suitable for implementing particular embodiments of the present invention includes a processor 901, a memory 903, an interface 911, and a bus 915 (e.g., a PCI bus or other interconnection fabric) and operates as a streaming server. When acting under the control of appropriate software or firmware, the processor 901 is responsible for modifying and transmitting live media data to a client. Various specially configured devices can also be used in place of a processor 901 or in addition to processor 901. The interface 911 is typically configured to end and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 900 is a content server that also includes a transceiver, streaming buffers, and a program guide database. The content server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the content server 991 handles requests and responses for media content related transactions while a separate streaming server provides the actual media streams.

Although a particular content server 991 is described, it should be recognized that a variety of alternative configurations are possible. For example, some modules such as a report and logging module 953 and a monitor 951 may not be needed on every server. Alternatively, the modules may be implemented on another device connected to the server. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method, comprising:
receiving a user interface event corresponding to a spline curve associated with an object displayed on a mobile device, wherein the user interface event triggers creation of a new spline curve based on computation of a new spline tangent associated with the spline curve and phase space-based dynamics of a new state, wherein phase space-based dynamics correspond to a plot of position versus velocity;

maintaining a scene graph having state information associated with the new state of the spline curve;

receiving a rendering event, the rendering event triggering the repainting of the object associated with the spline curve using the scene graph.

2. The method of claim 1, wherein the user interface event is a grab.

3. The method of claim 2, wherein the new state associated with the spline curve is a forced state.

4. The method of claim 1, wherein the user interface event is a drop.

5. The method of claim 4, wherein the new state associated with the spline curve is an unforced state.

6. The method of claim 1, wherein the user interface event is a drag.

7. The method of claim 6, wherein the spline curve is moved to a new location.

8. The method of claim 1, wherein the scene graph includes animation state and rendering state.

9. The method of claim 8, further comprising receiving an animation event associated with a spline curve, wherein the animation event is a periodic event generated by an animation timer independent of any user interface event.

10. The method of claim 9, wherein the animation event triggers the interpolation of the spline curve using state information in the scene graph.

11. The method of claim 10, wherein the spline curve is interpolated to obtain a current point in phase space.

12. The method of claim 11, wherein the current point is the position coordinate of the phase space vector.

13. A system, comprising:

an interface operable to receive a user interface event corresponding to a spline curve associated with an object displayed on a mobile device, wherein the user interface event triggers creation of a new spline curve based on computation of a new spline tangent associated with the spline curve and phase space-based dynamics of a new state, wherein phase space-based dynamics correspond to a plot of position versus velocity;

a processor operable to maintain a scene graph having state information associated with the new state of the spline curve;

wherein a rendering event triggers the repainting of the object associated with the spline curve using the scene graph.

14. The system of claim 13, wherein the user interface event is a grab.

15. The system of claim 14, wherein the new state associated with the spline curve is a forced state.

16. The system of claim 13, wherein the user interface event is a drop.

17. The system of claim 16, wherein the new state associated with the spline curve is an unforced state.

18. The system of claim 13, wherein the user interface event is a drag.

19. The system of claim 18, wherein the spline curve is moved to a new location.

20. An apparatus, comprising:

means for receiving a user interface event corresponding to a spline curve associated with an objected displayed on a mobile device, wherein the user interface event triggers creation of a new spline curve based on computation of a new spline tangent associated with the spline curve and phase space-based dynamics of a new state, wherein phase space-based dynamics correspond to a plot of position versus velocity;

means for maintaining a scene graph having state information associated with the new state of the spline curve;

means for receiving a rendering event, the rendering event triggering the repainting of the object associated with the spline curve using the scene graph.

* * * * *